(12) United States Patent
Li et al.

(10) Patent No.: US 10,785,302 B2
(45) Date of Patent: Sep. 22, 2020

(54) SYSTEMS AND METHODS FOR UNIFIED DATA MANAGEMENT IN A COMMUNICATION NETWORK

(71) Applicants: Xu Li, Nepean (CA); Nimal Gamini Senarath, Ottawa (CA)

(72) Inventors: Xu Li, Nepean (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 15/797,378

(22) Filed: Oct. 30, 2017

(65) Prior Publication Data

US 2018/0124175 A1 May 3, 2018

Related U.S. Application Data

(60) Provisional application No. 62/415,252, filed on Oct. 31, 2016.

(51) Int. Cl.
| | | |
|---|---|---|
| *H04L 29/08* | (2006.01) | |
| *G06F 16/22* | (2019.01) | |
| *G06F 16/27* | (2019.01) | |
| *H04W 12/08* | (2009.01) | |
| *H04L 12/24* | (2006.01) | |
| *H04W 24/02* | (2009.01) | |

(52) U.S. Cl.
CPC .......... *H04L 67/1097* (2013.01); *G06F 16/22* (2019.01); *G06F 16/27* (2019.01); *H04L 41/08* (2013.01); *H04L 41/12* (2013.01); *H04W 12/08* (2013.01); *H04L 41/5003* (2013.01); *H04W 24/02* (2013.01)

(58) Field of Classification Search
CPC ..... H04L 41/08; H04L 41/12; H04L 41/5003; H04L 67/1097; G06F 16/27; G06F 16/22; H04W 12/08; H04W 24/02
See application file for complete search history.

(56) References Cited

U.S. PATENT DOCUMENTS

| | | | |
|---|---|---|---|
| 7,797,409 B1 * | 9/2010 | Secer | H04L 41/22 709/223 |
| 8,090,943 B1 | 1/2012 | Tran | |
| 9,305,068 B1 * | 4/2016 | Esposito | G06F 16/256 |

(Continued)

FOREIGN PATENT DOCUMENTS

| | | |
|---|---|---|
| CN | 103415842 A | 11/2013 |
| CN | 104298779 A | 1/2015 |

(Continued)

OTHER PUBLICATIONS

International Search Report dated Jan. 26, 2018 for corresponding International Application No. PCT/CN2017/108456 filed Oct. 31, 2017.

(Continued)

*Primary Examiner* — Todd L Barker

(57) ABSTRACT

Systems and methods are disclosed for unified data management in a communication network. According to embodiments, the unified data management methods and systems can provide management of some control plane data, for example data that may be shared by multiple network functions (NF). According to embodiments, virtualization of the data storage if further provided.

14 Claims, 10 Drawing Sheets

Data repository

(56) References Cited

U.S. PATENT DOCUMENTS

| | | | |
|---|---|---|---|
| 2015/0244687 A1 | 8/2015 | Perez et al. | |
| 2015/0373546 A1* | 12/2015 | Haugen | H04W 12/08 |
| | | | 726/22 |
| 2016/0014992 A1 | 1/2016 | Link et al. | |
| 2017/0311304 A1* | 10/2017 | Lu | H04W 4/70 |
| 2018/0014198 A1* | 1/2018 | Suh | H04L 63/105 |
| 2018/0234916 A1* | 8/2018 | Song | H04W 48/20 |
| 2018/0324576 A1* | 11/2018 | Salkintzis | H04W 12/06 |
| 2019/0021064 A1* | 1/2019 | Ryu | H04W 68/005 |
| 2019/0037636 A1* | 1/2019 | Kim | H04W 8/02 |
| 2019/0138400 A1* | 5/2019 | Csatari | G06F 9/45558 |
| 2019/0182895 A1* | 6/2019 | Di Girolamo | H04L 63/0892 |

FOREIGN PATENT DOCUMENTS

| | | |
|---|---|---|
| WO | 2012067964 A1 | 5/2012 |
| WO | 2016095644 A1 | 6/2016 |

OTHER PUBLICATIONS

Huawei, Hisilicon, CATR, "Solution: Consolidated architecture option X SA WG2", Meeting #117, NextGen/Rel-14. S2-165645. Oct. 17-21, 2016.

3GPP Technical Specification Group Services and System Aspects; Study on Architecture for Next Generation System (Release 14) TR 23.799 V1.0.0. Sep. 30, 2016.

China Mobile et al., "Agreement on The Overall Architecture", Specification Group Services and System, FS_NextGen / Rel-14. S2-166171, Oct. 19-23, 2016.

3GPP TR 23.799 V1.1.0: Study on Architecture for Next Generation System, Oct. 2016.

* cited by examiner

SYSTEMS AND METHODS FOR UNIFIED DATA MANAGEMENT IN A COMMUNICATION NETWORK

CROSS REFERENCE TO RELATED APPLICATIONS

This application claims the benefit of priority to U.S. Provisional Patent Application Ser. No. 62/415,252 filed on Oct. 31, 2016 and entitled Systems and Methods for Unified Data Management in a Communication Network, the contents of which are incorporated by reference.

FIELD OF THE INVENTION

The present invention pertains to the field of communication networks and in particular to systems and methods for unified data management in a communication network.

BACKGROUND

In the $3^{rd}$ Generation Partnership Project; Technical Specification Group Services and System Aspects; Study on Architecture for Next Generation System (3GPP TR 23.799 V0.8.0), the features of consolidated architecture option 2 are discussed. In this section, there is a discussion regarding next generation user data management.

The 3GPP discusses user data management defining the feature as "[s]tore user subscription data, policy data (e.g. QoS and charging), session/user related context and state in a unified data layer. Such a unified data layer is to reduce redundant state information in multiple network functions. It also aims at "stateless" network functions, i.e., state and context information could be easily relocated and restored to benefit from virtualization." However, no further features are defined in relation user data management.

Therefore there is a need for methods and systems for unified data management in a communication network.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide methods and systems for unified data management in a communication network. In accordance with an aspect of the present invention, there is provided a method for unified data management in a communication network. The method includes receiving configuration data indicative of a binding between a unified data management layer and a data storage. The method further includes receiving a unified data action request with respect to the data storage and accessing the data storage to perform the action request.

According to some embodiments, the unified data action request is received directly from an operational support system. In some embodiments the unified data action request is received from an operational support system via a service capability exposure function. In some embodiments, the unified data action request is received from an operational support system via an element management system. According to some embodiments, the unified data action request is indicative of one or more of requesting data, storing data and updating data.

In accordance with an aspect of the present invention, there is provided a method for unified data management in a communication network. The method includes receiving a unified data request with respect to a data repository, the unified data request indicative of an action to be performed regarding data. The method further includes accessing the data repository to perform the unified data request.

According to some embodiments, the unified data request is indicative of a request for one or more of data storage and data retrieval. According to some embodiments, the unified data request is received from a network exposure function. According to some embodiments, the data includes one or more of user data, subscription data and policy data.

In accordance with an aspect of the present invention, there is provided a device for unified data management in a communication network. The device includes a processor and machine readable memory storing machine executable instructions. When executed by the processor, the machine readable instructions configure the device to perform one or more of the above defined methods.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 1:
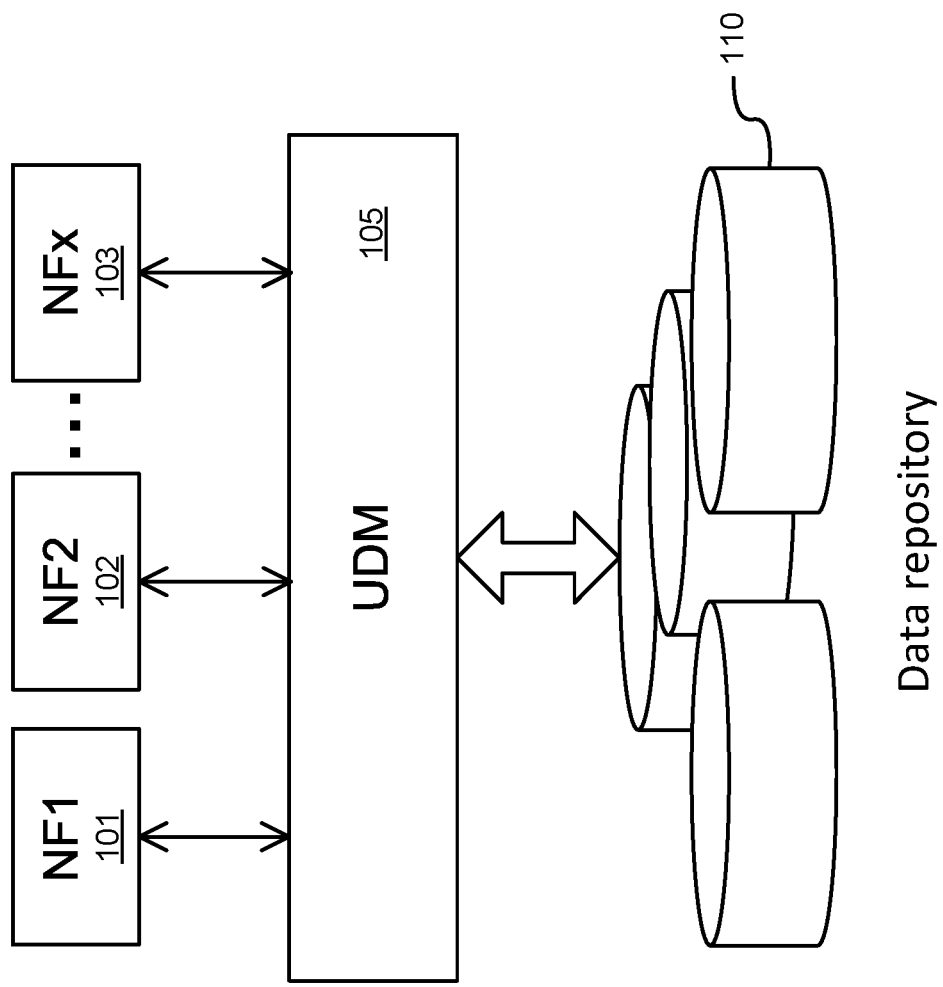
FIG. 1 illustrates a schematic of a system providing unified data management (UDM) between a data repository and a plurality of Network Functions, in accordance with embodiments of the present invention.

The present invention provides methods and systems for unified data management in a communication network.

According to embodiments, the unified data management methods and systems can provide management of some control plane data, for example data that may be shared by multiple network functions (NF). Examples of the control plane data can include user data, subscription data, quality of service policy data and other types of control plane data. Through unified data management of this control plane data, redundancy of storage of this data in the communication network may be mitigated.

For next generation communication networks, there is provided a virtualization environment for communication network management, where communication network includes virtualized and non-virtualized network functions (NFs). Some of these NFs are configured to handle data forwarding in the communication network, for example user plane NFs, while other NFs are configured for controlling these user plane NFs in order to meet the data communication requirements of the communication network. In addition, there is a network management plane (MP) which is used by the network manager to properly set up and configure these NFs, which can include one or a combination of instantiation, configuration, modification and termination of the NFs. According to embodiments, for this communication network environment, there is provide a database configuration such that a common database management unit, for example unified data management, which is used by a plurality of control plane functions and management plane functions to access data required for these NFs. It is understood, that access can be used to defined requesting, storing, updating or a combination thereof of data. The UDM is configured such that the management plane MP can perform initial setup of the UDM, and further modify the configuration of the UDM for example when a new NF is instantiated, when a new slice is instantiated or when a new data location needs to be set up. In each case, the MP can configure the UDM such that the necessary data that is required by the NFs can be accesses. In some embodiments, the MP further configures the NFs by informing them how to access the necessary data.

According to embodiments, the system and methods for unified data management provide a means for the masking of the data repository where the data is stored, for example masking the location and storage mechanism. In this manner, a unified data access configuration may be used in order to access the required data by a network function, wherein the network function does not require the explicit knowledge of where the data is stored. The unified data access configuration can be provided by one or more procedures, application program interfaces (APIs) or in the form of a SQL statement, or other configuration that can provide for the access, storage, updating, querying or a combination thereof of data in the data repository. The masking of the data repository in this manner may also enable the movement of the data, without the unified data access configuration requiring to be modified.

According to embodiments, unified data management can be enabled by the integration of a unified data layer. The unified data layer can be configured as a function, a data access layer or service or other configuration that would provide the required functionality of unified data management. According to embodiments, unified data management is configured to provide natively enabled unified data access in the network elements hosting physical network functions or in the virtualization environments hosting virtualized network functions. For example, unified data access can be configured as part of an operating system or hypervisor offering unified data access to native functions using the operating system or hypervisor as a computing environment.

In some embodiments, configuring UDM can include the configuration of a function which may be virtualized or non-virtualized and may have one or more instances thereof located in the communication network. In some embodiments, configuring the UDM can include the configuration of network elements, the virtualization of environments to enable unified data access or both.

According to embodiments, as data is decoupled from NFs and relocatable, the management plane needs to manage data location in addition to NF location during network slicing. For example, management support of unified data management (UDM) can be provided by virtualized storage, non-virtualized storage or a combination thereof. In this configuration, the NFs in the control plane use virtualized storage, wherein access to which can be managed via the UDM to perform various control plane tasks relating to data access. As data is decoupled from the NFs and stored in virtual storages and the virtual storages are bonded to the UDM, the NFs can be able to use the UDM to access the stored data.

In some embodiments, during the slice creation process, the data location, i.e. which network function virtualization infrastructure point of presence (NFVI-PoP) accommodates what data, is determined. The data location decision can be made with respect to the storage capability of NFVI-PoP and may aim for minimizing data access cost, maximizing data access performance or a combination thereof. The management and orchestration function (MANO) can instantiate virtual storage at the determined data locations and inform the network management system, for example on the management plane, about the virtual storages. The network management system can configure the virtual storages with the data structure and the data content. The network management system can further configure the UDM in order to bind the UDM with the virtual storages.

In some embodiments, different NFs in the control plane of a network slice may access different types of data. The session management function needs access to the slice user plane (UP) topology data for performing path selection. The mobility management function needs to access the user equipment (UE) location data for performing location tracking. The authentication function needs to access the user subscription data for performing authorization.

According to some embodiments, there is provided a method for the modification of the UDM based on the creation of a new network slice or the modification of a network slice. The method includes requesting of a new data storage requirement for a network entity based on the creation of a network slice or modification of a network slice. The method further includes configuring the UDM by the management plane, wherein the configuration of the UDM includes the binding of the UDM with the new data storage. The relevant network entities can subsequently be informed, for example by the management plane through a configuration command or other means, regarding the access method for the specific data in the new data storage. The method also includes the receiving of an access request from one or more network entities for a specific data unit and the provision of access to the data unit being requested.

FIG. 1 illustrates a schematic of a system providing unified data management between a data repository and a plurality of network functions, in accordance with embodiments of the present invention. The NFs 101, 102, 103 can access the UDM 105 using one or more different methods, for example using a unified data access application program interface (API), protocol, SQL statement or other method as would be readily understood. NF 101, 102, 103 access to the UDM 105 can provide the NF with the means to request, store and update data, and the provision of the data to the NF via the UDM. The UDM 105 can access the data repository 110 which stores some of the control plane and this access is provided by a raw data access method, for example a specific raw data access API, raw data access protocol, raw data access SQL statements or other method for access for enabling the requesting, storing, updating or a combination thereof of the specific data from the data repository for provision to the NFs. According to embodiments, the data repository can be configured as a relation database, non-relational database or other storage device as would be readily understood by a worker skilled in the art. Furthermore the data repository may be plural storage devices that may or may not even be located at the same location within the communication network.

According to embodiments, the management plane of the communication network is configured to manage the UDM which can be located within the control plane of the communication network. The management of the UDM includes the configuration of the UDM and the data access methods for accessing the UDM for provision of access to the stored data.

According to embodiments, the configuration of the UDM includes the binding of the UDM to the data repository, thereby providing the UDM with the information necessary for access to the data stored on the data repository. As previously noted, the data repository can include a plurality of databases which may or may not be located at the same location within the communication network. This binding of the UDM with the data repository can include the provision of the input to the UDM which includes database addresses, port numbers, database names, database passwords, database types and other input which the UDM will require in order to gain access to the one or more databases, file systems or other means for data storage that form the data repository.

According to embodiments, the configuration of the UDM further includes the configuring of the connection between the control plane function and the UDM and the access control policies associated therewith. This connection between the control plane function and the UDM can include the provision to the control plane of the name or address or both which is associated with the UDM. In some embodiments, the access control policies can be configured at the UDM and relate the data access privileges for the plurality of NFs that may be requesting data via the UDM. In some embodiments, the access control policies further include the categorization of data such that different NFs can have different levels of access to the respective data. In some embodiments, this categorization of the data can include characteristics relating to security, slice, service, service type, user equipment (UE), UE type, traffic type, data type, accessing NF type and other characteristics as would be readily understood.

According to embodiments, the configuration of the UDM further includes parameters relating to modification of the configuration of the UDM. For example, if a new category of data is added to the data repository, access control policies need to be updated or adapted through the management plane. In addition, when a data repository is changed, or if a data category is changed, the configuration of the UDM would require suitable modification in order to account for this updated information, thereby maintain suitable access to the data by the NFs via the UDM.

According to embodiments, upon the configuration of the UDM, the management plane accesses the UDM in order to populate the data repository with the control data to be stored thereby for access by NFs of the control plane. This access of the UDM by the management plane can further provide access to runtime control plane data.

In some embodiments, the management plane configures the UDM such that the UDM notifies the control plane function when a change in data in the data repository has occurred. Through this substantially automatic notification of control plane function, the UDM can subsequently notify the NFs to pull the updated data that may be required for operational thereof. In this manner, through a substantially automatic notification, the NFs are would be operating using the most up to date data.

Figure 2:
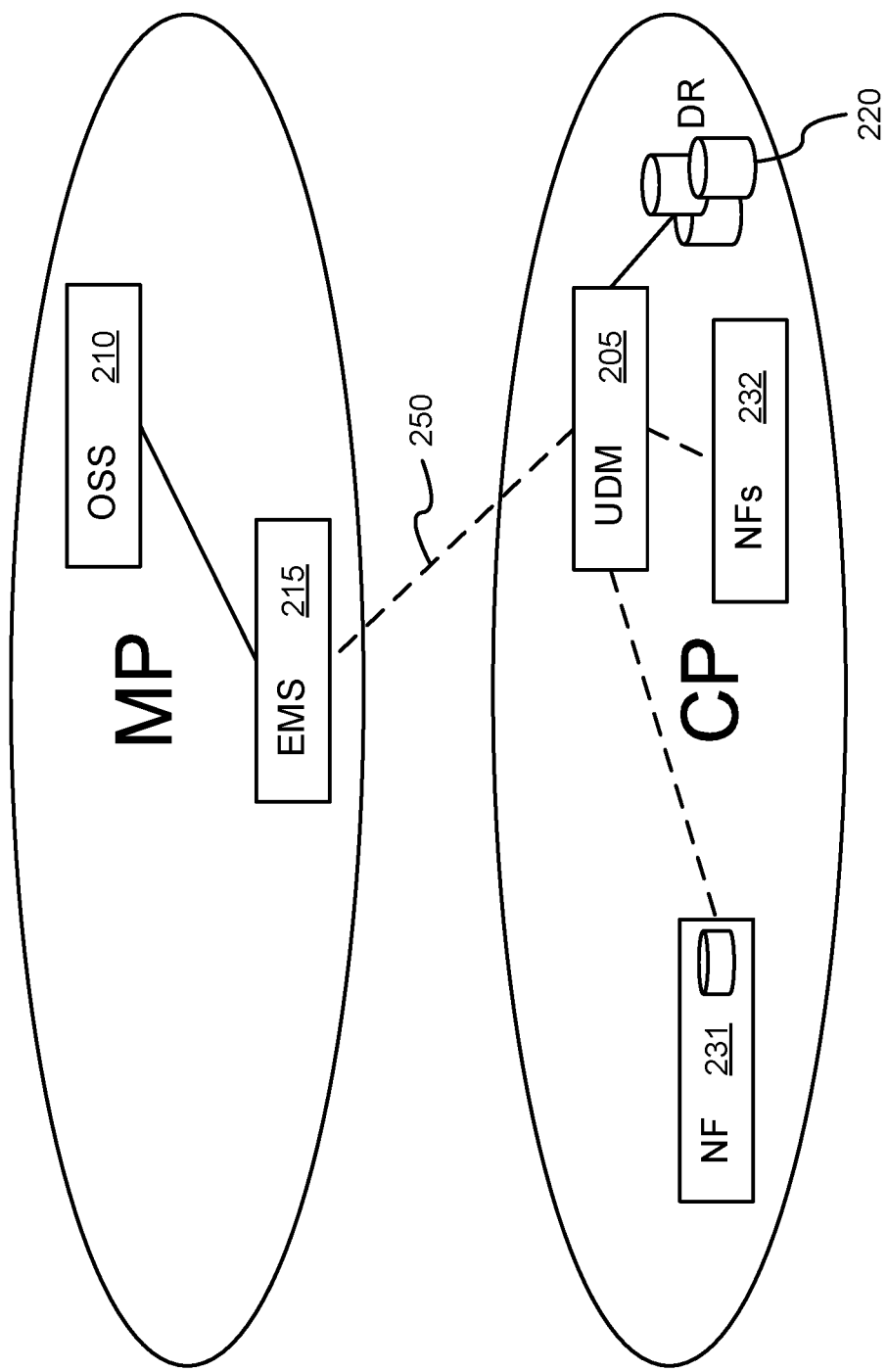
FIG. 2 illustrates a schematic of configuration of a system providing UDM, in accordance with embodiments of the present invention.

FIG. 2 illustrates a schematic of configuration of a system providing unified data management (UDM), in accordance with embodiments of the present invention. The UDM 205 manages some control plane data as is located within the control plane as illustrated. The operational support system (OSS) 210 is configured to communicate with the element management system (EMS) 215 within the management plane (MP) and the EMS 215 during communication with the UDM 205 provides the configuration information to the UDM for configuration thereof. This configuration of the UDM 205 can provide a means for binding the UDM and the data repository (DR) 220. The OSS 210 can include functions that support back-office activities which aid in operating a communication network, as well as provision and maintain customer services and the like. And the EMS 215 can comprise system and application for managing network elements, which can include manageable logical entities uniting one or more physical devices. The NFs 231, 232 are provided with unified data access to the UDM and the UDM is provided with raw data access to the data repository.

Figure 3:
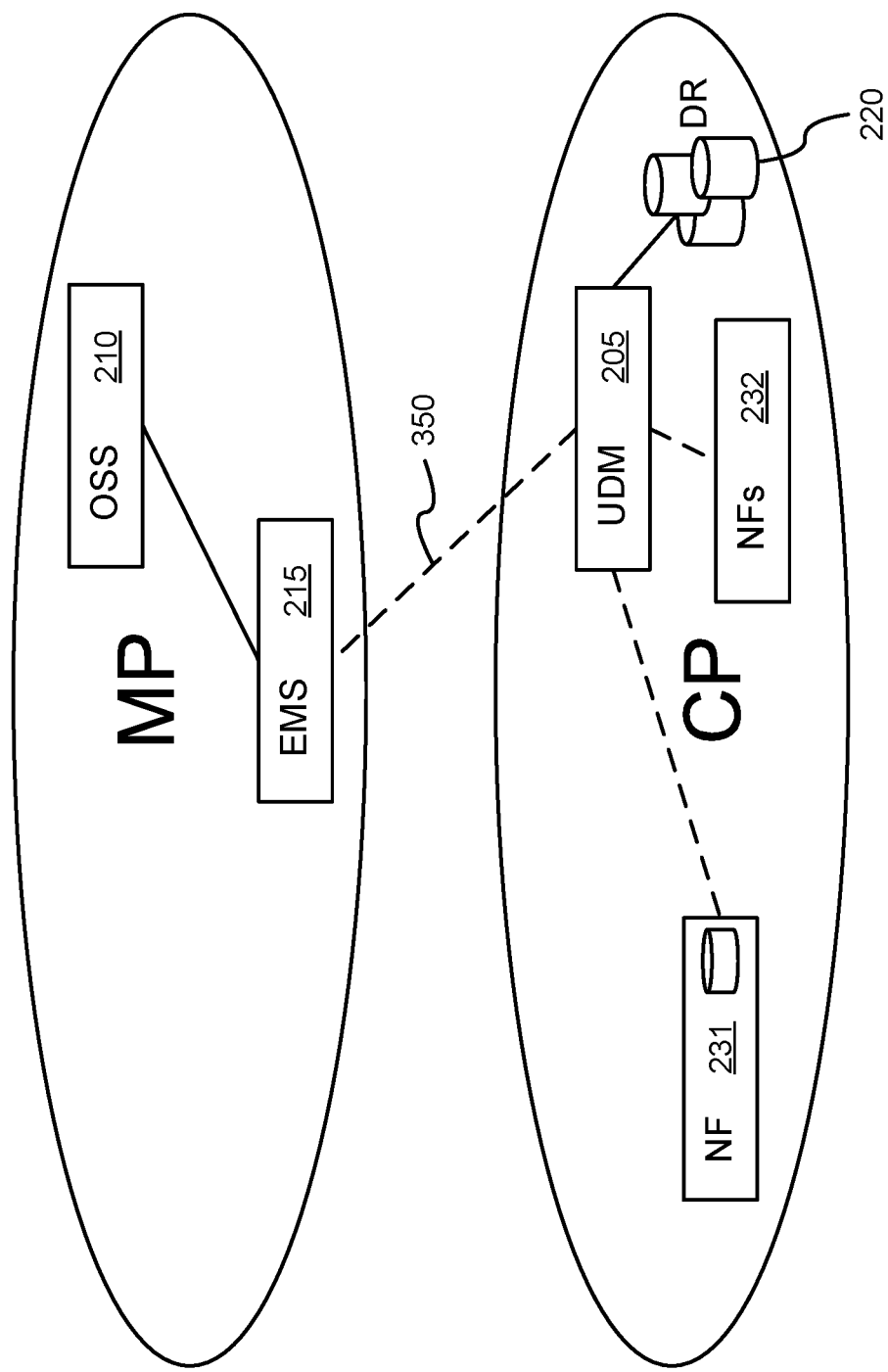
FIG. 3 illustrates a schematic showing operational support system (OSS) access to the UDM for requesting, storing, updating or a combination thereof of data in the data repository, in accordance with embodiments of the present invention.

According to embodiments, upon configuration of the UDM as illustrated in FIG. 2, FIG. 3 illustrates a schematic showing OSS 210 access to the UDM 205 for one or more of requesting, storing and updating data in the data repository, wherein the OSS 210 interacts with the UDM 205 through the EMS 215 in the management plane for populating the data repository 220 with the control plane data and also to provide access to the stored control plane data. It is noted that the link connecting the EMS 215 and the UDM 205 is illustrated using different line formats in FIG. 2 and FIG. 3. The line format used in FIG. 3 indicates that this connection relates to unified data access 350, whereas the line format illustrated in FIG. 2 is used to indicate configuration communication 250.

Figure 4:
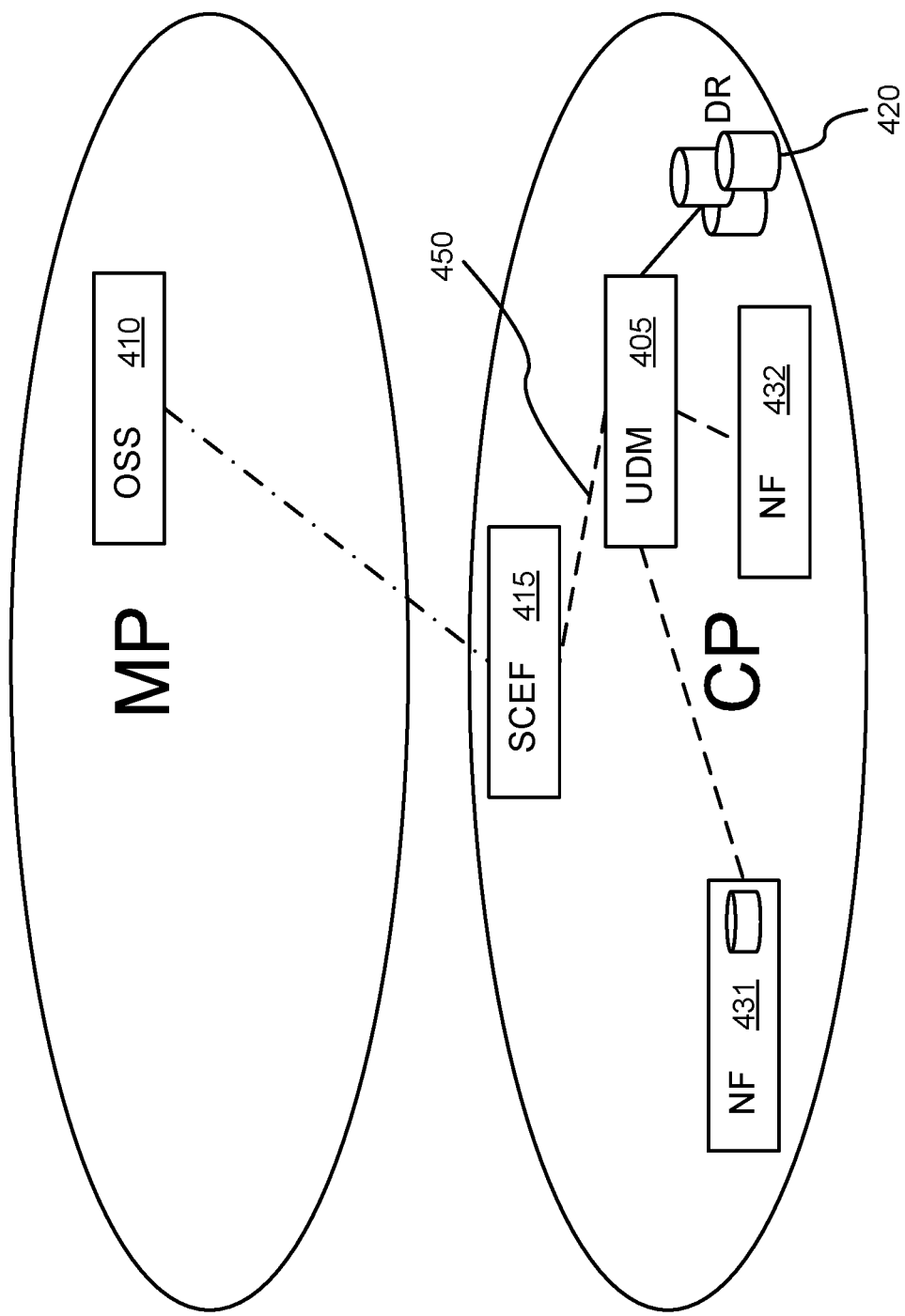
FIG. 4 illustrates a schematic of configuration of a system providing UDM, in accordance with embodiments of the present invention.

FIG. 4 illustrates a schematic of configuration of a system providing UDM, in accordance with embodiments of the present invention. The UDM 405 manages some control plane data as is located within the control plane as illustrated. The OSS 410 is configured to communicate with the service capability exposure function (SCEF) 415 which is located in the control plane. This communication between the OSS 410 and the SCEF 415 may be configured via a web-based API or other communication link. A web-based API can be configured like a HTTP request, for example. The SCEF 415 entity provides a means to securely expose the services and capabilities provided by interfaces, for example the UDM 405. For example, the SCEF 415 exposes the UDM 405 to the OSS 410, thus providing the OSS 410 with the means for providing configuration information to the UDM 405 for configuration thereof. This configuration of the UDM 405 can provide a means for binding the UDM and the data repository 420. The NFs 431, 432 are provided with unified data access to the UDM 405 and the UDM is provided with raw data access to the data repository.

Figure 5:
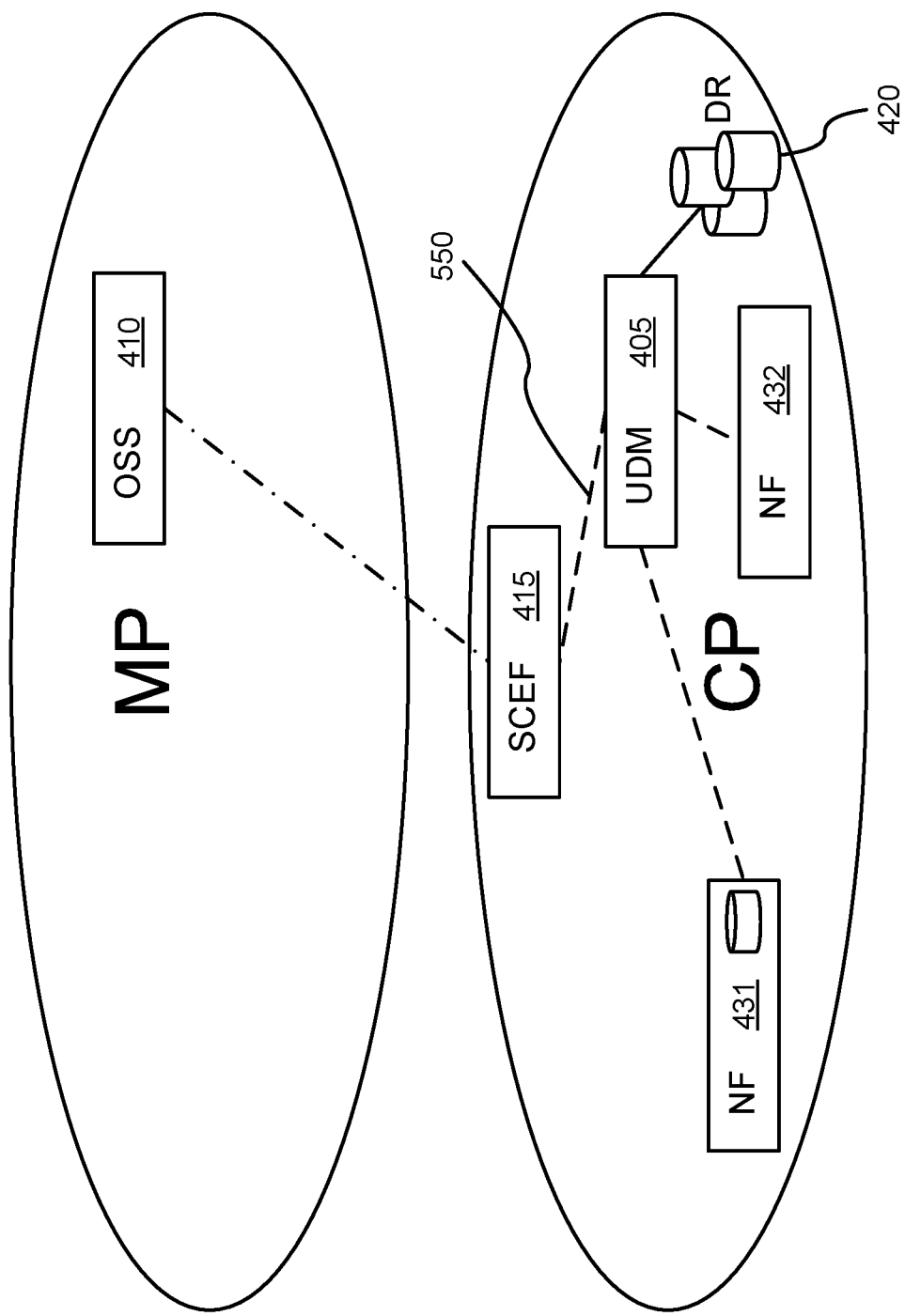
FIG. 5 illustrates a schematic showing OSS access to the UDM for requesting, storing, updating or a combination thereof of data in the data repository, in accordance with embodiments of the present invention.

According to embodiments, upon configuration of the UDM as illustrated in FIG. 4, FIG. 5 illustrates a schematic showing OSS 410 access to the UDM 405 for one or more of requesting, storing and updating data in the data repository, wherein the SCEF 415 operating in the control plane exposes the UDM 405 to the OSS 420 for access thereby. In this manner the OSS 420 is provided with access to the UDM 405 for populating the data repository 420 with the control plane data and also to provide access to the stored control plane data. It is noted that the link connecting the SCEF 415 and the UDM 405 is illustrated using different line formats in FIG. 4 and FIG. 5. The line format used in FIG. 5 indicates that this connection relates to unified data access 550, whereas the line format illustrated in FIG. 4 is used to indicate configuration communication 450.

Figure 6:
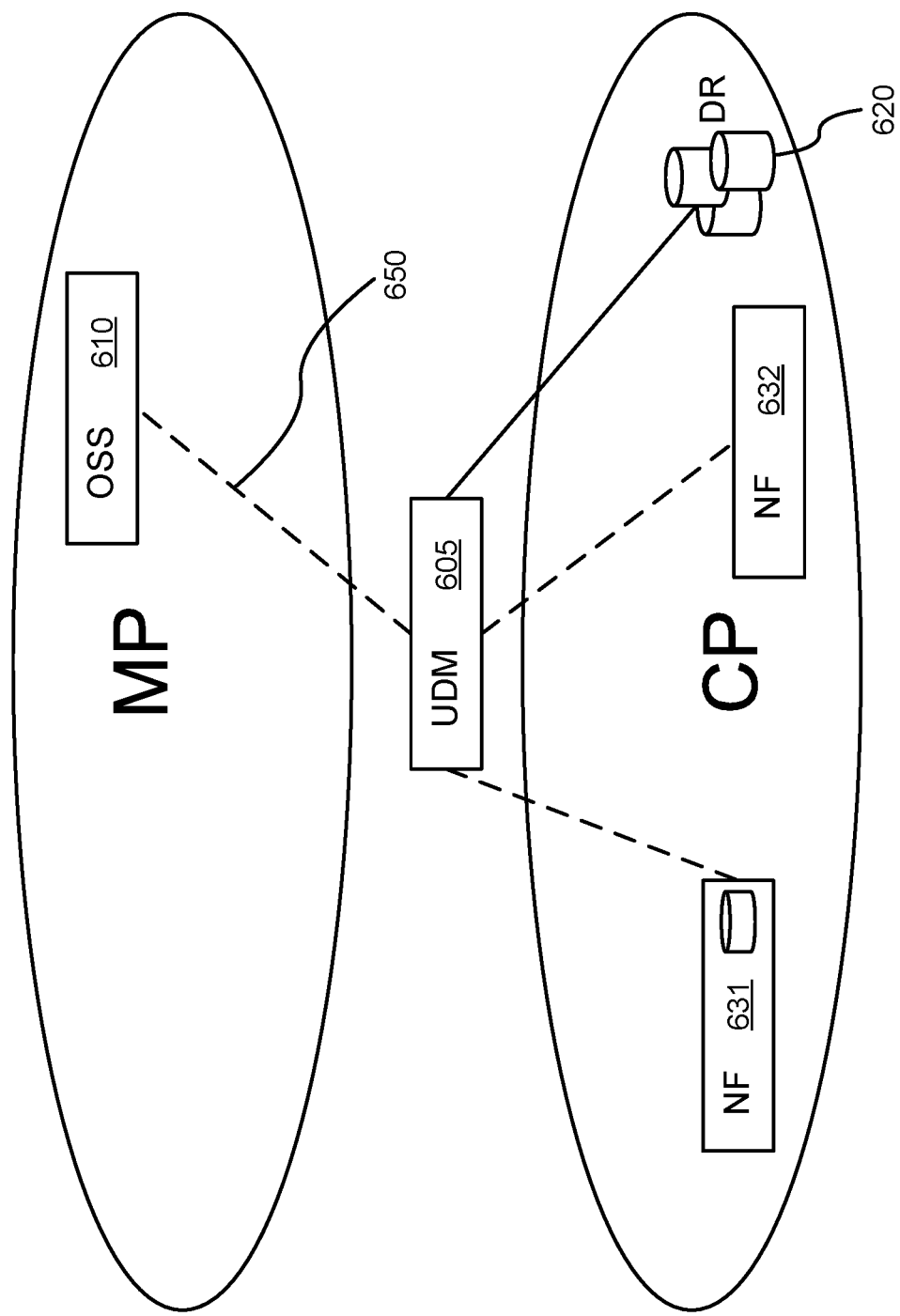
FIG. 6 illustrates a schematic of configuration of a system providing UDM, in accordance with embodiments of the present invention.

FIG. 6 illustrates a schematic of configuration of a system providing UDM, in accordance with embodiments of the present invention. The UDM 605 manages some control plane data as is located within an access layer that is accessible to both the control plane and the management plane, as illustrated. The OSS 610 is provided with direct access to the UDM 605, thus providing the OSS 610 with the means for providing configuration information to the UDM 605 for configuration thereof. This configuration of the UDM 605 can also provide a means for binding the UDM and the data repository 620. The NFs 631, 632 are provided with unified data access to the UDM 605 and the UDM is provided with raw data access to the data repository 620.

Figure 7:
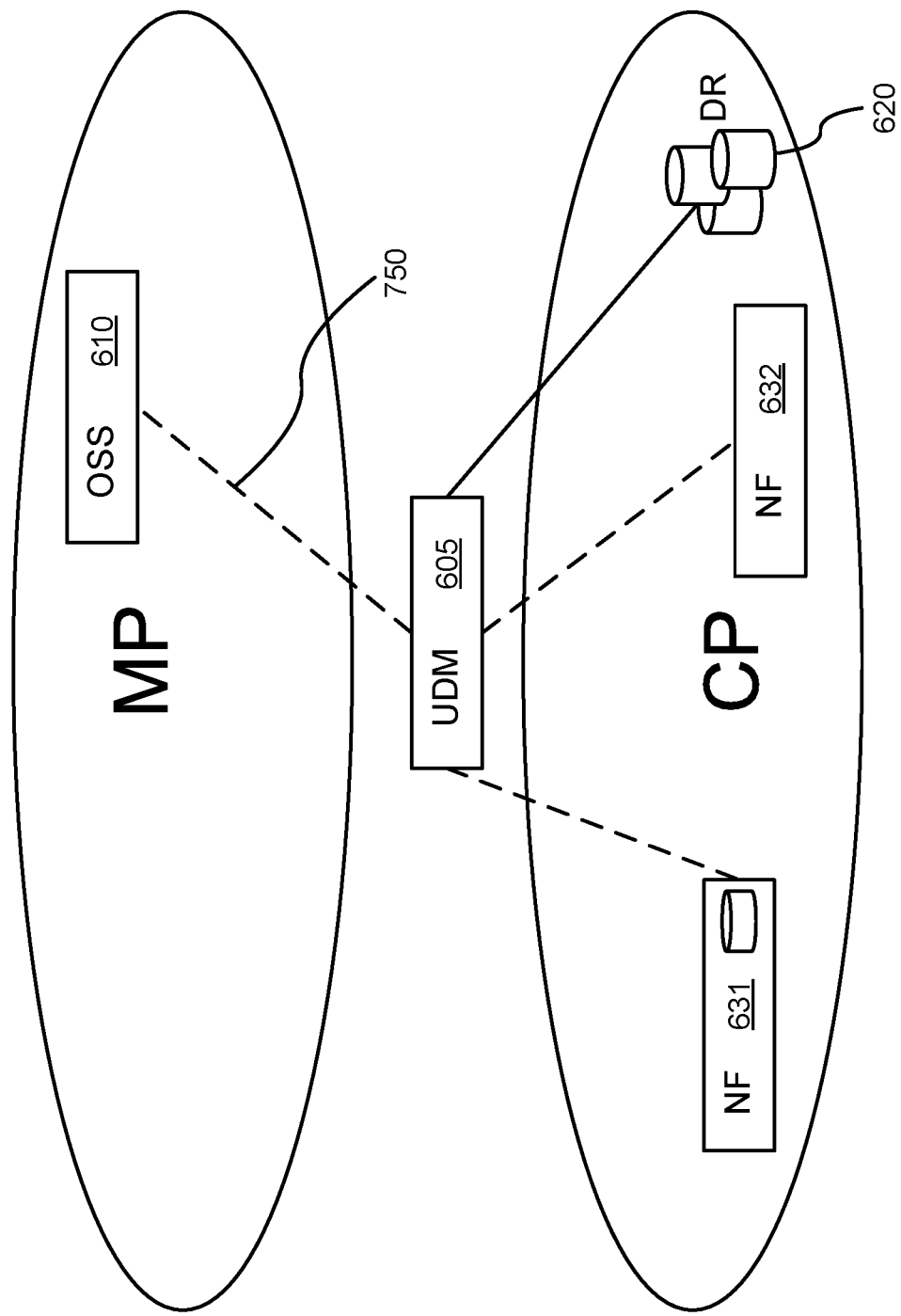
FIG. 7 illustrates a schematic showing OSS access to the UDM for requesting, storing, updating or a combination thereof of data in the data repository, in accordance with embodiments of the present invention.

According to embodiments, upon configuration of the UDM as illustrated in FIG. 6, FIG. 7 illustrates a schematic showing direct OSS 610 access to the UDM 605 for one or more of requesting, storing and updating data in the data repository. In this manner the OSS 610 is provided with direct access to the UDM 605 for populating the data repository with the control plane data and also to provide access to the stored control plane data. It is noted that the link connecting the OSS 610 and the UDM 605 is illustrated using different line formats in FIG. 6 and FIG. 7. The line format used in FIG. 7 indicates that this connection relates to unified data access 750, whereas the line format illustrated in FIG. 6 is used to indicate configuration communication 650.

According to embodiments, the data storage associated with the data repository is virtualized. In some instances this virtualization of the data storage can be performed as part of network slicing of the communication network. In order to enable data storage virtualization, information relating to data storage requirements and data access description can be needed. For example, this information can include indications of who will access the data, what data will be accessed by whom, and the frequency of this data access. This information is provided as part of a slicing request to the network component that is responsible for making slicing decisions or slice modification decisions or both. In some embodiments, the network component is the OSS.

According to embodiments, during the performance of network slicing, the network slicing decision can include the identification of the data storage location. For example, a model can be defined as a facility location problem, wherein the model is optimized in order to minimize data access costs overall. As another example, a two-stage approach can be taken for making the slicing decision. In the first stage, the location and interconnection of NFs is determined. In the second stage, according to the determined NF location and the UDM requirement (such as which NF accesses what data and the data access frequency), a determination of where the data should be located can be made. In the second stage, the data storage location problem can be modeled as a facility location problem, where the location of the data storage is optimized to minimize data access costs overall with respect to the storage capability constraints at candidate locations. In some embodiments, the data access costs can include network resources required to transfer data from the data repository to the NF requesting the data, the frequency of requests for data and other data access costs as would be readily understood by a worker skilled in the art. In some embodiments, the optimization of the placement of the data storage can be determined based on the specific data that is stored in the data storage and the NFs that will require access to this specific data. In some embodiments, the location of the data storage is dependent on the network slice with which it is associated.

In some embodiments, network slice adaption or updating can include the relocating or merging of one or more of the virtualized data storage locations which form the data repository.

In some embodiment, the management plane configures or reconfigures the UDM with respect to changes relating to the virtualization of data storage, for example, location, merging or other changes of the virtualized data storage.

Figure 8:
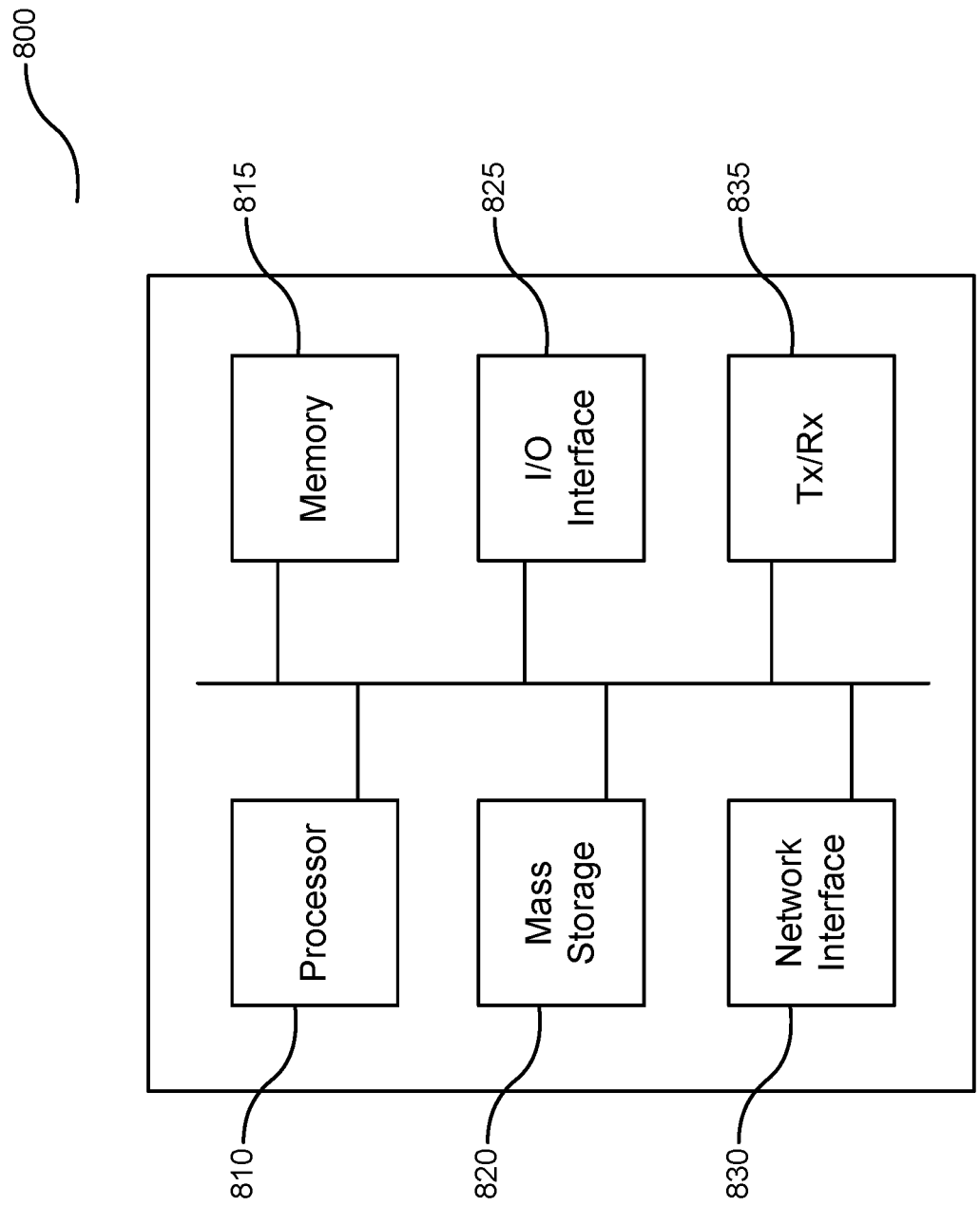
FIG. 8 is a schematic diagram of a hardware device, according to an embodiment.

FIG. 8 is a schematic diagram of a hardware device 800 that may for example, comprise nodes or functional entities of the communications system, or perform any or all of steps of the above methods and features described herein, according to different embodiments of the present invention. As shown, the device includes a processor 810, memory 815, non-transitory mass storage 820, I/O interface 825, network interface 830, and a transceiver 835, all of which are communicatively coupled via bi-directional bus. According to certain embodiments, any or all of the depicted elements may be utilized, or only a subset of the elements. Further, device may contain multiple instances of certain elements, such as multiple processors, memories, or transceivers. Also, elements of the hardware device may be directly coupled to other elements without the bi-directional bus.

The memory 815 may include any type of non-transitory memory such as static random access memory (SRAM), dynamic random access memory (DRAM), synchronous DRAM (SDRAM), read-only memory (ROM), any combination of such, or the like. The mass storage 820 element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage may have recorded thereon statements and instructions executable by the processor for performing any of the aforementioned method steps described above.

In some embodiments, the hardware device 800 can be an electronic device (ED) and may be an element of communications network infrastructure, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or a Public Land Mobility Network (PLMN). In other embodiments, the electronic device or hardware device may be a device that connects to the network infrastructure over a radio interface, such as a mobile phone, smart phone or other such device that may be classified as a User Equipment (UE). In some embodiments, ED or hardware device may be a Machine Type Communications (MTC) device (also referred to as a machine-to-machine (m2m) device), or another such device that may be categorized as a UE despite not providing a direct service to a user. In some references, an ED or hardware device may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, transceivers etc. For example, As shown in FIG. 8, the device includes a processor 1005 such as a Central Processing Unit (CPU), and may further include specialized processors such as a Graphics Processing Unit (GPU) or other such processors.

The electronic device or hardware device 800 can include one or more network interfaces 830, which may include at least one of a wired network interface and a wireless network interface. A network interface may include a wired network interface to connect to a network, and also may include a radio access network interface for connecting to other devices over a radio link. When ED or hardware device is a network infrastructure element, the radio access network interface may be omitted for nodes or functions acting as elements of the PLMN other than those at the radio edge (e.g. an eNB). When ED or hardware device is infrastructure at the radio edge of a network, both wired and wireless network interfaces may be included. When ED or hardware device is a wirelessly connected device, such as a User Equipment, radio access network interface may be present and it may be supplemented by other wireless interfaces such as WiFi network interfaces. The network interfaces allow the electronic device to communicate with remote entities such as those connected to network.

According to embodiments, a video adapter and the I/O interface 825 provide interfaces to couple the electronic device or hardware device to external input and output devices. Examples of input and output devices include a display coupled to the video adapter and an I/O device such as a touch-screen coupled to the I/O interface. Other devices may be coupled to the electronic device or hardware device, and additional or fewer interfaces may be utilized. For example, a serial interface such as Universal Serial Bus (USB) (not shown) may be used to provide an interface for an external device. Those skilled in the art will appreciate that in embodiments in which ED or hardware device is part of a data center, I/O interface and Video Adapter may be virtualized and provided through network interface.

In some embodiments, electronic device or hardware device 800 may be a standalone device, while in other embodiments electronic device or hardware device may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

As would be understood, the UDM as defined above together with the data storage or data repository, substantially associates data of the data repository with one or more network entities with which it is associated, thereby in essence providing a unified data storage or unified data repository (UDR). In this manner, the unified data management methods and systems of the instant application can provide management of at least some control plane data, for example data that may be shared by multiple network functions (NF). Examples of the control plane data can include user data, subscription data, quality of service policy data and other types of control plane data. Through unified data management of this control plane data, redundancy of storage of this data in the communication network may be mitigated.

Figure 9:
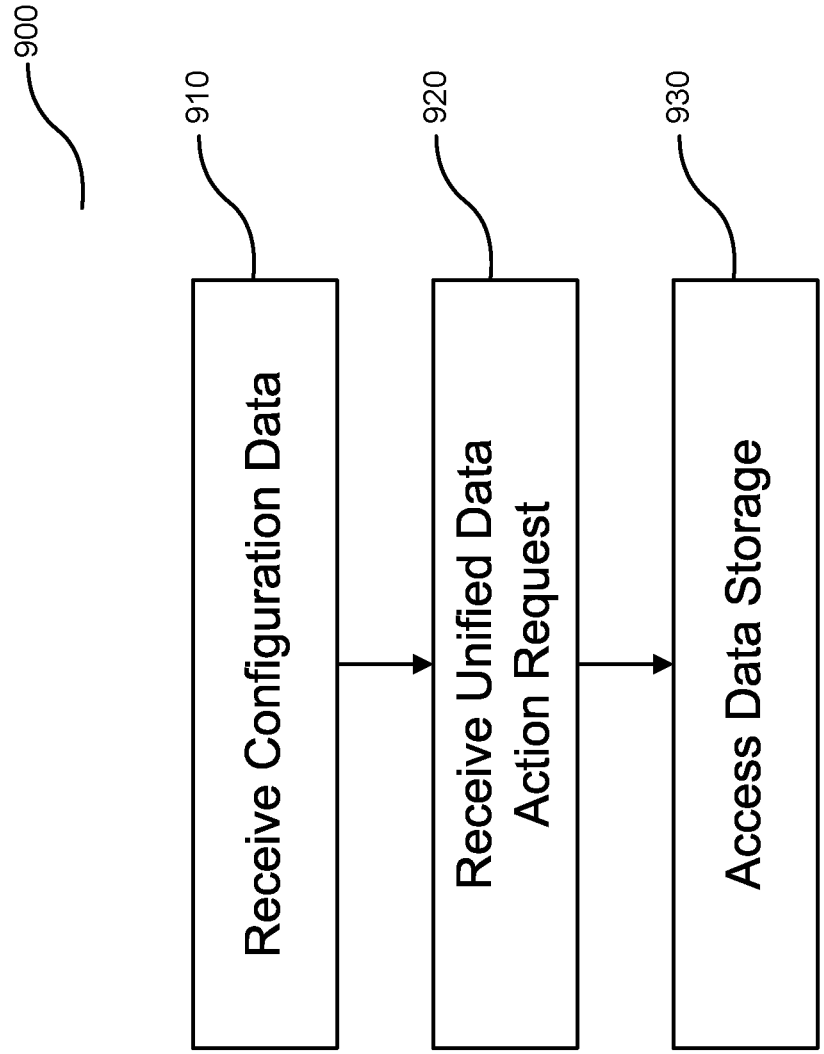
FIG. 9 illustrates a method for unified data management in a communication network in accordance with embodiments of the present invention.

According to embodiments, as illustrated in FIG. 9, there is provided a method 900 for unified data management in a communication network. The method includes receiving 910 configuration data indicative of a binding between a unified data management layer and a data storage or data repository. For example, the binding of the UDM to the data repository can provide the UDM with the information necessary for access to the data stored on the data repository. As non-limiting examples, the binding of the UDM with the data repository can include the provision of the input to the UDM which includes database addresses, port numbers, database names, database passwords, database types and other input which the UDM will require in order to gain access to the one or more databases, file systems or other means for data storage that form the data repository. The method further includes receiving 920 a unified data action request with respect to the data storage. For example, unified data action request can be indicative of one or more of a request for data or retrieving data, storing data and updating data. It will be readily understood that the unified data action request may also be terms a unified data request. The method further includes accessing 930 the data storage to perform the unified data action request. In some embodiments, the unified data action request is received from a service capability exposure function (SCEF), which may also be know as a network capability exposure function (NCEF) or a network exposure function (NEF). In some embodiments, the data that is stored in the data storage or data repository is user data, subscription data, quality of service policy data or other policy data.

According to some embodiments the configuration data includes information relating to the masking of one or more of a location of the data storage and a storage medium. The masking of the data repository can enable the data repository to be configured using one or more of virtualized storage and non-virtualized storage. According to some embodiments binding includes the provision of input to gain access to the data storage, for example database address, port number, database name, database password and database type.

Figure 10:
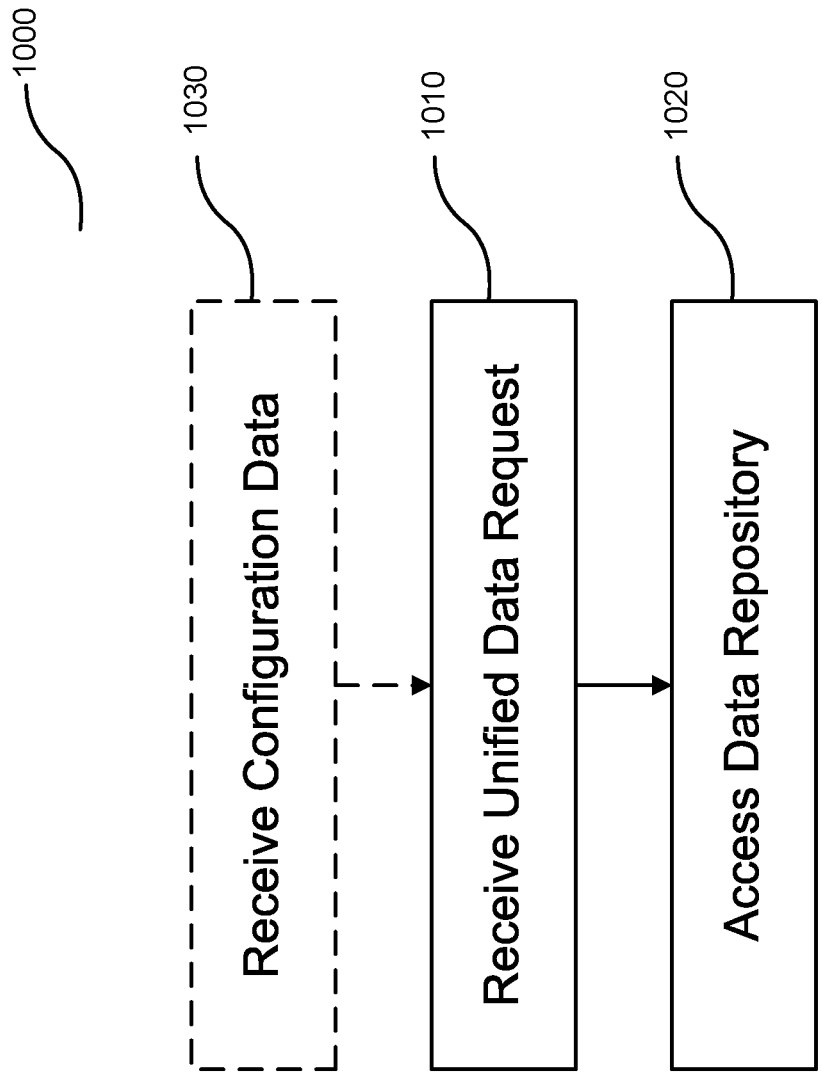
FIG. 10 illustrates a method for unified data management in a communication network in accordance with embodiments of the present invention.

According to embodiments, as illustrated in FIG. 10, there is provided a method 1000 for unified data management in a communication network. The method includes receiving 1010 a unified data request with respect to a data repository, the unified data request indicative of an action to be performed regarding data. For example, the unified data request can be a request for data storage or a request for data retrieval. The method further includes accessing 1020 the data repository to perform the unified data request. According to some embodiments, the unified data request can be received from a network exposure function (NEF). In addition, according to some embodiments, the data with respect to which a request has been received, can relate to one or more of user data, subscription data and policy data.

According to some embodiments, the unified data request is aligned with a configuration of the data repository. The UDM as defined above together with the data repository, substantially associates data of the data repository with one or more network entities or other aspect of the communication network with which it is associated. As such, the UDM as defined above together with the data repository in essence provides a unified data storage or unified data repository (UDR). As such, in some embodiments, the method further includes receiving configuration data which is indicative of a binding of UDM with the data repository, thereby configuring the UDR. This binding provided by the configuration data can be defined by information relating to the masking of one or more of a location of the data repository and a storage medium. The masking of the data repository can enable the data repository to be configured using one or more of virtualized storage and non-virtualized storage. In some embodiments binding includes the provision of input to gain access to the data repository, for example database address, port number, database name, database password and database type.

It should further be understood that different embodiments have been discussed in the context of individual features or elements. This has been for the sake of simplifying the discussion. Features and elements introduced in one embodiment may be combined with the features and elements introduced in other embodiments. In one non-limiting example provided solely for the purposes of illustration, the OSS is provided with direct access to the UDM for populating the data repository with the control plane data and also to provide access to the stored control plane data. In this example, the OSS is also configured to communicate with the service capability exposure function (SCEF) which is located in the control plane.

According to embodiments of the present invention, there is provided a method for unified data management in a communication network. The method includes transmitting configuration data indicative of a binding between a unified data management layer and a data storage and transmitting a unified data action request with respect to the data storage.

According to embodiments of the present invention, there is provided a method for unified data management in a communication network. The method includes receiving a unified data request for data stored within the data storage, accessing the data storage using a raw data access request for the data and transmitting the data.

According to embodiments of the present invention, there is provided a method for unified data management in a communication network. The method includes receiving a request for data storage, said request received during creation or modification of a network slice and evaluating a suitable location for the data storage based on location of expected network functions requiring access to data in the data storage and frequency of the expected network functions requiring access. The method further includes optimizing the suitable location based on network resources required for provision of access to the data Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. Moreover, in some instances the present invention has been described using reference to terminology specific to LTE, it is readily understood that the use of these terms is meant to be illustrative and not limiting. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for unified data management in a communication network, the method comprising:
    receiving, from a management plane of a communication network, configuration data indicative of a binding of a unified data management (UDM) layer to a data repository;
    configuring the UDM layer based on the binding indicated by the configuration data to provision the UDM layer with input which is required for the UDM layer to access the data repository and access control policies for a plurality of network functions of the communication network to access control plane data stored in the data repository via the UDM layer, wherein at least some of the control plane data is shared by the plurality of network functions, the control plane data including one or more of user data, subscription data and quality of service policy data;
    receiving, from the management plane of a communication network, configuration data indicative of a modification of the binding of the UDM layer to the data repository based on the creation of a new network slice or a modification of a network slice, wherein the modification of the binding relates to one or more of a new category of control plane data, update of the access control policies and a change in data storage of the data repository;
    modifying the configuration of the UDM layer based on the modification of the binding;
    receiving, at the UDM layer, a unified data action request to access the data repository, the unified data action request received directly from an operational support system or from a service capability exposure function or from an element management system; and accessing, by the UDM layer, the data repository using the input provisioned at the UDM layer, wherein each of the plurality of network functions is at least one of a session management function, a mobility management function and an authentication function and wherein different network functions have levels of access to the control data plane, the levels including at least one of security slice, service type and accessing network function type.

2. The method according to claim 1, wherein the unified data action request to access the data repository is for one or more of requesting control plane data from the data repository, storing control plane data in the data repository and updating control plane data stored in the data repository.

3. The method according to claim 1, wherein accessing the data repository is performed using a raw data access method.

4. The method according to claim 1, wherein the configuration data includes masking of one or more of a location of data storage of the data repository and a storage mechanism.

5. The method according to claim 1, wherein the input includes one or more of database address, port number, database name, database password and database type.

6. A device comprising:
a processor; and
machine readable memory storing machine executable instructions which when executed by the processor configure the device to:
receive, from a management plane of a communication network, configuration data indicative of a binding a unified data management (UDM) layer to a data repository;
configure the UDM layer based on the binding indicated by the configuration data to provision the UDM layer with input which is required for the UDM layer to access the data repository and access control policies for a plurality of network functions of the communication network to access control plane data stored in the data repository via the UDM layer, wherein at least some of the control plane data is shared by the plurality of network functions, the control plane data including one or more of user data, subscription data and quality of service policy data;
receive, from the management plane of a communication network, configuration data indicative of a modification of the binding of the UDM layer to the data repository based on the creation of a new network slice or a modification of a network slice, wherein the modification of the binding relates to one or more of a new category of control plane data, update of the access control policies and a change in data storage of the data repository;
modify the configuration of the UDM layer based on the modification of the binding; receive a unified data action request to access the data repository, the unified data action request received directly from an operational support system or from a service capability exposure function or from an element management system; and
access the data repository using the input provisioned at the UDM layer;
wherein each of the plurality of network functions is at least one of a session management function, a mobility management function and an authentication function and wherein different network functions have levels of access to the control data plane, the levels including at least one of security slice, service type and accessing network function type.

7. The device according to claim 6, wherein the data repository includes one or more of virtualized data storage and non-virtualized data storage.

8. The device according to claim 6, wherein the unified data action request to access the data storage is for of-one or more of requesting control plane data from the data storage, storing control plane data in the data storage and updating control plane data stored in the data storage.

9. The device according to claim 6, wherein the configuration data includes masking of one or more of a location of data storage of the data repository and a storage mechanism.

10. A method comprising:
receiving, at a unified data management (UDM) repository provisioned with input which is required for a UDM layer of the UDM repository to access a data repository of the UDM repository and access control policies for a plurality of network functions of the communication network to access control plane data stored in the data repository via the UDM layer configuration data indicative of a modification of a binding of the UDM layer to the data repository based on the creation of a new network slice or a modification of a network slice, wherein the modification of the binding relates to one or more of a new category of control plane data, update of the access control policies and a change in data storage of the data repository, and wherein the control plane data stored in the data repository includes one or more of user data, subscription data and quality of service policy data;
modifying a configuration of the UDM layer based on the modification of the binding;
receiving, at the UDM repository, a unified data request to access the data depository for one or more of requesting control plane data from the data repository, storing control plane data in the data repository and updating control plane data stored in the data repository, the control plane data including one or more of user data, subscription data and quality of service policy data; and
accessing, by the UDM layer, the data repository using the input to perform the one or more of the requesting of the control plane data, the storing of the control plane data, or the updating of the control plane data;
wherein each of the plurality of network functions is at least one of a session management function, a mobility management function and an authentication function and wherein different network functions have levels of access to the control plane data, the levels including at least one of security, slice, service type and accessing network function type.

11. The method according to claim 10, wherein the unified data request is received from a network exposure function.

12. A device for unified data management in a communication network, the device comprising:
a processor; and
machine readable memory storing machine executable instructions which when executed by the processor configure the device to implement at a unified data management (UDM) repository provisioned with input which is required for a UDM layer of the UDM repository to access a data repository of the UDM repository and access control policies for a plurality of network functions of the communication network to access control plane data stored in the data repository via the UDM repository, the control plane data including one or more of user data, subscription data and quality of service policy data, wherein at least some of the control plane data is shared by the plurality of network functions, the UDM repository configured to:

receive configuration data indicative of a modification of a binding of the UDM layer to the data repository based on the creation of a new network slice or a modification of a network slice, wherein the modification of the binding relates to one or more of a new category of control plane data, update of the access control policies and a change in data storage of the data repository, and wherein the control plane data stored in the data repository includes one or more of user data, subscription data and quality of service policy data:

modify a configuration of the UDM layer based on the modification of the binding; receive a unified data request to access the data repository for one or more of requesting control plane data from the data repository, storing control plane data in the data repository and updating control plane data stored in the data repository, the unified data request including a request to for; and access, by the UDM layer, the data repository using the input to perform the one or more of the requesting of the control plane data, the storing of the control plane data, or the updating of the control plane data;

wherein each of the plurality of network functions is at least one of a session management function, a mobility management function and an authentication function and wherein different network functions have levels of access to the control plane data, the levels including at least one of security, slice, service type and accessing network function type.

13. The device according to claim 12, wherein the unified data request is received from a network exposure function.

14. The method according to claim 1, further comprising reconfiguring the UDM layer based on changes relating to a location of the data storage or merging of the data storage with other data storages.

\* \* \* \* \*

UNITED STATES PATENT AND TRADEMARK OFFICE
CERTIFICATE OF CORRECTION

PATENT NO. : 10,785,302 B2
APPLICATION NO. : 15/797378
DATED : September 22, 2020
INVENTOR(S) : Xu Li and Nimal Gamini Senarath Page 1 of 1

It is certified that error appears in the above-identified patent and that said Letters Patent is hereby corrected as shown below:

In the Claims

Column 14, Line 8, Claim 8 "is for of-one or" should read --is for one or--

Column 16, Line 1, Claim 12 "a request to for; and" should read --a request to--

Signed and Sealed this
Twenty-second Day of December, 2020

Andrei Iancu
*Director of the United States Patent and Trademark Office*